US007673795B2

(12) United States Patent
Millett et al.

(10) Patent No.: US 7,673,795 B2
(45) Date of Patent: Mar. 9, 2010

(54) MANIPULATION OF UNIFIED MESSAGING PINS

(75) Inventors: Thomas W. Millett, Seattle, WA (US); Sridhar Sundararaman, Bellevue, WA (US); Srinivasa Manda, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1006 days.

(21) Appl. No.: 11/400,740

(22) Filed: Apr. 7, 2006

(65) Prior Publication Data

US 2007/0125847 A1 Jun. 7, 2007

Related U.S. Application Data

(60) Provisional application No. 60/742,919, filed on Dec. 6, 2005.

(51) Int. Cl.
*G06K 5/00* (2006.01)

(52) U.S. Cl. .................. 235/382; 235/492; 235/380; 340/5.6; 379/88.17; 379/88.26; 379/88.19

(58) Field of Classification Search ............... 235/382, 235/492, 380; 340/5.6; 379/88.17, 88.26, 379/88.19
See application file for complete search history.

(56) References Cited

U.S. PATENT DOCUMENTS

| 4,025,905 | A | 5/1977 | Gorgens |
| 6,340,116 | B1 | 1/2002 | Cecil et al. |
| 7,224,775 | B1 * | 5/2007 | Shaffer et al. ............ 379/88.16 |
| 2003/0145200 | A1 | 7/2003 | Eden |
| 2003/0191945 | A1 | 10/2003 | Keech |
| 2004/0146147 | A1 | 7/2004 | Picard et al. |
| 2005/0111648 | A1 | 5/2005 | Roome |
| 2005/0138393 | A1 | 6/2005 | Challener et al. |
| 2005/0166263 | A1 | 7/2005 | Nanopoulos et al. |
| 2005/0211785 | A1 * | 9/2005 | Ferber et al. ................. 235/492 |
| 2008/0211654 | A1 * | 9/2008 | Kasamatsu .................. 340/461 |

FOREIGN PATENT DOCUMENTS

| WO | WO 2004054297 A1 | 12/2002 |
| WO | WO 2005027056 A1 | 3/2005 |

OTHER PUBLICATIONS

Jansen, "Authenticating Users on Handheld Devices," Proceedings of the Canadian Information Technology Security Symposium, May 2003, The National Institute of Standards and Technology, 13 pages, U.S.A.

Bond et al., "Decimalisation Table Attacks for PIN Cracking," Technical Report UCAM-CL-TR-560, University of Cambridge, Computer Laboratory, Feb. 2003, 13 pages, U.K.

Unknown, AltiWare OE 4.5, System Administration and Installation Manual, 455 pages, Altigen Communications, Inc., Jul. 2002, U.S.A.

* cited by examiner

*Primary Examiner*—Allyson N Trail
(74) *Attorney, Agent, or Firm*—Senniger Powers LLP

(57) ABSTRACT

Generating a series of digits corresponding to a personal identification number (PIN) of a user for unified messaging access to personal information management (PIM) data. Data involved in the generation of the series of digits along with the series of digits are stored for subsequent use during authentication of the user and PIN updates.

20 Claims, 6 Drawing Sheets

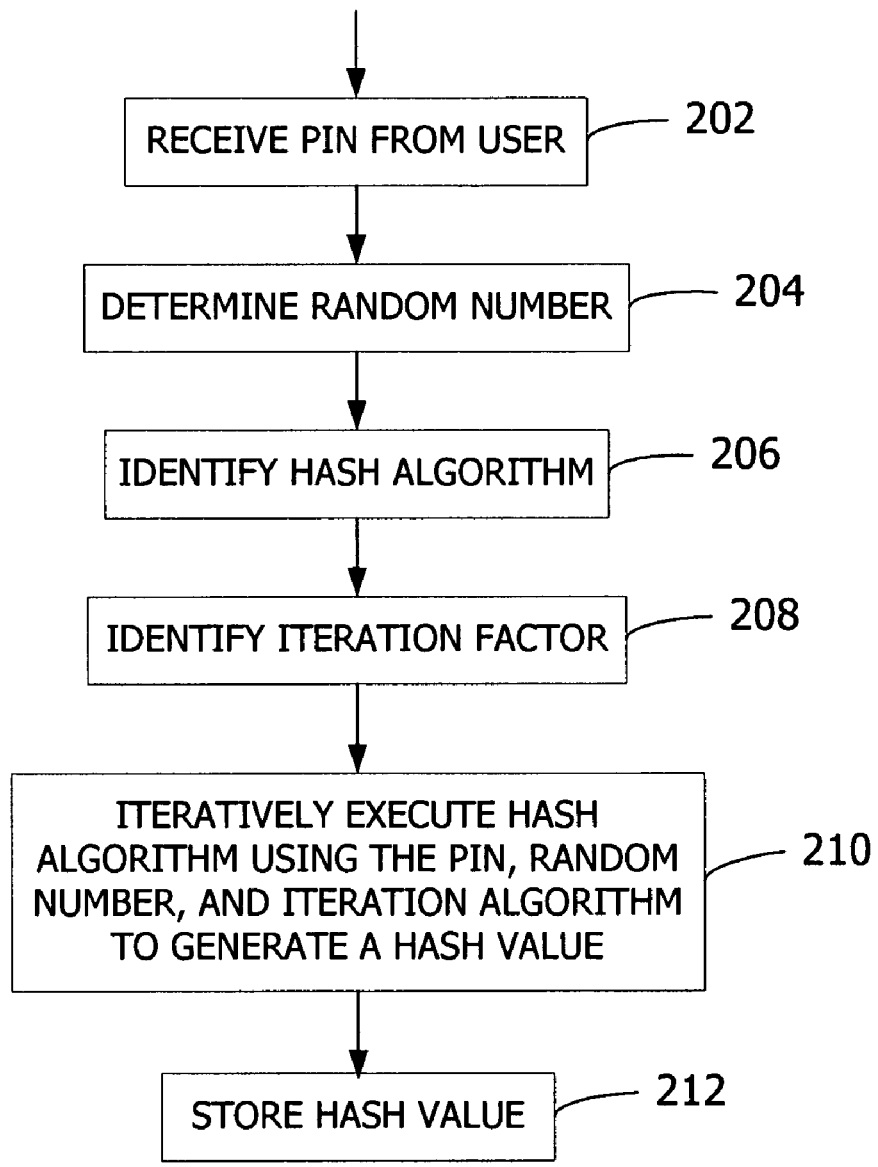

MANIPULATION OF UNIFIED MESSAGING PINS

CROSS-REFERENCE TO RELATED APPLICATION

This application claims the benefit of U.S. Provisional Application No. 60/742,919, filed Dec. 6, 2005, herein incorporated by reference in its entirety.

BACKGROUND

Existing software products allow users to remotely access their personal information management (PIM) data such as voice mail from any touch-tone telephone. Securing access to this PIM data is vital and, in keeping with standard voicemail products, the existing software products may be configured to require a personal information number (PIN) for authentication before granting a user permission to hear and/or send information. Advantages of PIN-based authentication include user familiarity with this paradigm and minimal hardware requirements (e.g., a telephone) for the end user.

While convenient, however, PIN-based security has numerous shortcomings. Existing systems do not securely persist PINs for subsequent validation during the logon process. Current locations for storing the PINs have information disclosure problems or are unprotected against owner tampering.

Further, numeric-only PINs carry substantially less cryptographic entropy than alpha-numeric passwords. Numeric-only PINs allow ten choices per position, while alpha-numeric PINs may have seventy or so possible choices. Even PINs of nearly impractical lengths (e.g., ten digits) that are obfuscated by industry standard one-way hash algorithms such as SHA512 can be quickly cracked by a dictionary style attack. In general, the typical one-way hash is only marginally better than no protection at all.

SUMMARY

Embodiments of the invention securely manipulate a unified messaging personal identification number (PIN) for a user. A series of digits corresponding to the PIN may be generated based on, for example, the PIN, a random number, a transformation, and an iteration factor for the transformation. Storing the generated series of digits along with the random number, the transformation, and the iteration factor enables subsequent authentication of the user, subsequent PIN updates, and non-disruptive modification of the transformation and iteration factor. The random number, transformation, and iteration factor may differ for each PIN of the user or other users.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 2 is an exemplary flow chart illustrating the generation of a hash value based on an input PIN.

Corresponding reference characters indicate corresponding parts throughout the drawings.

DETAILED DESCRIPTION

Figure 1:
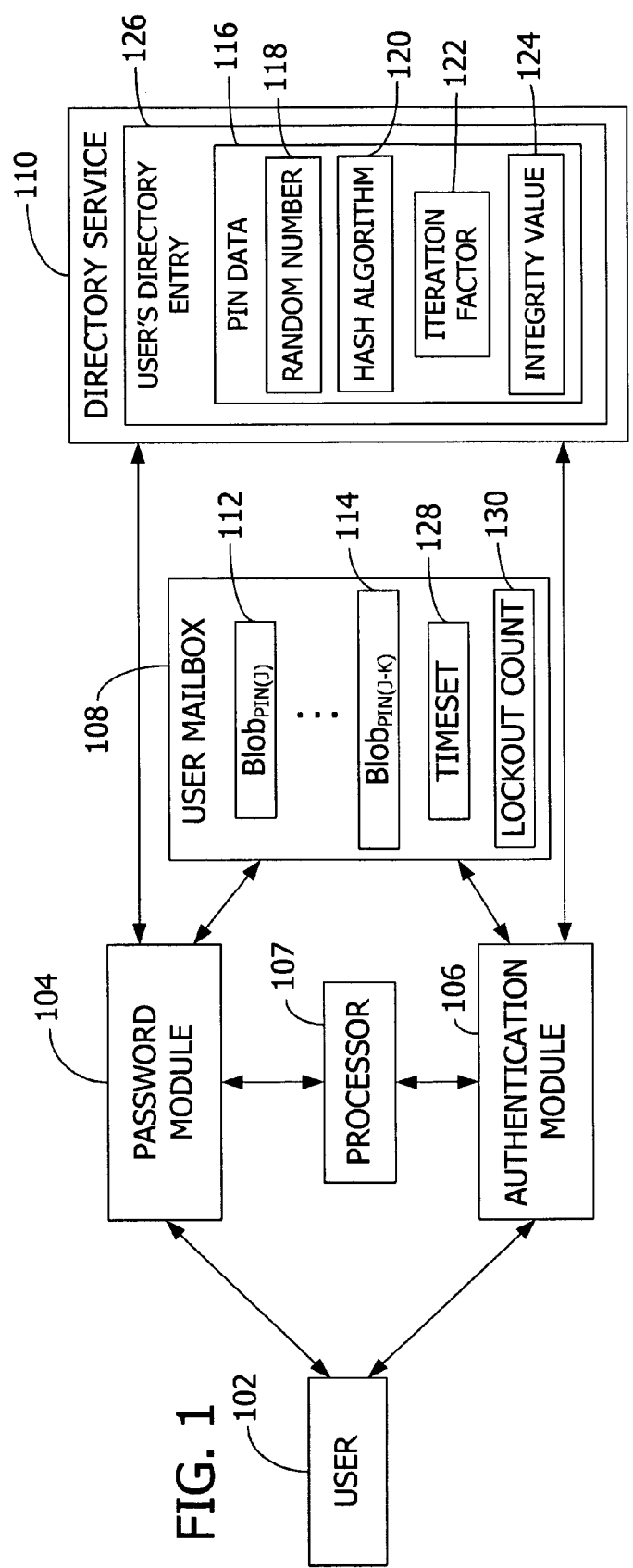
FIG. 1 is an exemplary block diagram illustrating the secure storage of personal identification numbers (PINs).

FIG. 1 illustrates an exemplary architecture for providing access to personal information management (PIM) data through use of a personal identification number (PIN). Aspects of the invention improve the security of PINs in a unified messaging system by storing each PIN of arbitrary length in a particular format and in a particular location. Embodiments of the invention isolate the benefits of existing storage patterns while avoiding the downsides of the existing storage patterns. In an embodiment, the invention combines anti-cracking techniques with a distributed storage solution. When combined, the particular techniques and storage solution provide significant protection over existing PIN maintenance techniques.

Referring to FIG. 1, an exemplary architecture provides access to PIM data. A user 102 interacts with an authentication module 106 to logon and with a password module 104 to establish a PIN or update a PIN. The authentication module 106 and the password module 104 access a user mailbox 108 and a directory service 110 to logon the user 102 and manipulate the PIN of the user 102. A processor 107 executes the authentication module 106 and the password module 104. A binary large object (blob), binary object, hash value, transformation value, or other series of digits corresponding to each PIN (e.g., $\text{Blob}_{PIN(J)}$ 112 through $\text{Blob}_{PIN(J-K)}$ 114) may be generated as a function of a PIN and PIN data 116 (e.g., a random number 118, a hash algorithm 120, and an iteration factor 122 for the hash algorithm 120). While hashing is discussed with reference to FIG. 1 and elsewhere, aspects of the invention are operable with any transformation. The blob may be stored, for example, in the user mailbox 108 (e.g., a first memory area) while the directory service 110 (e.g., a second memory area) may store the PIN data 116 such as the random number 118, the hash algorithm 120 (or an identifier associated therewith), the iteration factor 122, and an integrity value 124 (e.g., a hash or checksum) associated with the blob. The PIN data 116 is stored in a user's directory entry 126 in the directory service 110 in one embodiment. In another embodiment, the random number 118, the hash algorithm 120 (or identifier associated therewith), and the iteration factor 122 are stored in a memory area other than the directory service 110 while the integrity value 124 is stored in the directory service 110. In one embodiment, the directory service 110 or other memory area further stores a lockout count 130 used to prevent repeated attempts to access the PIM data and a timeset 128 value corresponding to the time of the last update to the PIN by the user 102. While not explicitly illustrated in FIG. 1, aspects of the invention support storage and manipulation of one or more numeric or alphanumeric PINs for each of a plurality of users.

Storing the blob separately from the PIN data 116 provides improved security over systems that store the blob and the PIN data 116 in one memory area. For example, storing all the PIN data (including the blob) in the user mailbox 108 is not secure because the user 102 has full read/write access to the mailbox 108. The user 102 may accidentally or intentionally (e.g., unknowingly via a malicious script) overwrite some or all of the PIN data. For example, the user 102 (e.g., perhaps by unwittingly running an attacker's script) could over-write the blob with a blob that would authenticate an arbitrarily chosen PIN regardless of company security policies for minimum PIN length, number of old PINs disallowed, PIN complexity, and/or PIN expiration rules by directly manipulating the PIN data. In another example, storing all the PIN data (including the blob) in the directory service 110 leaves the PIN data vulnerable to information disclosure because although the directory service 110 may be writeable only by the system, it is may be readable by many users.

The directory service 110, global directory, distributed directory, or the like enables applications and users to find, use, and manage directory resources such as user names, network printers, and permissions in a distributed computing environment. The directory can be used to locate and administer network users and resources. In one embodiment, aspects of the invention are operable with the Active Directory brand directory service of Microsoft Corporation, Redmond, Wash.

Referring again to FIG. 1, one or more computer-readable media have computer-executable components such as the password module 104 and the authentication module 106 for controlling access to the PIM data. The password module 104 receives a first PIN from the user 102, identifies a hash algorithm (e.g., hash algorithm 120) and an iteration factor (e.g., iteration factor 122), and executes the identified hash algorithm iteratively based on the iteration factor, the first PIN, and a random number (e.g., random number 118) to generate a first binary object corresponding to the first PIN. The password module 104 subsequently calculates a first integrity value (e.g., a checksum, or integrity value 124) as a function of the first binary object and stores only the hash algorithm, the iteration factor, the random number, the first integrity value, and the first binary object as PIN data corresponding to the first PIN. That is, the first PIN itself is not explicitly stored.

The authentication module 106 receives a second PIN from the user 102 and executes the hash algorithm (e.g., hash algorithm 120) identified in the PIN data (e.g., PIN data 116) based on the second PIN, the random number from the PIN data, and the iteration factor (e.g., iteration factor 122) from the PIN data to create a second binary object. The authentication module 106 further calculates a second integrity value as a function of the second binary object. The authentication module 106 grants access to the PIM data associated with the user 102 as a function of comparing the second integrity value with the first integrity value from the PIN data and comparing the second binary object with the first binary object from the PIN data.

Referring next to FIG. 2, an exemplary flow chart illustrates the generation of a hash value based on an input PIN. The method receives a PIN from a user at 202, determines a random number (e.g., generates or receives the random number) at 204, identifies a hash algorithm adapted to operating on the received PIN and the determined random number at 206, identifies an iteration factor at 208, and executes the identified hash algorithm iteratively at 210 based on the iteration factor to generate a hash value or other series of digits corresponding to the PIN. The hash value is stored at 212. The hash algorithm, iteration factor, and random number may be identified or generated based on preferences (e.g., defined by an administrator). In one embodiment, the received PIN may be evaluated for conformance to administrator policies (e.g., PIN length and complexity) before the hash algorithm is executed.

To compensate for the lack of cryptographic entropy in existing systems, the techniques of salting and iterative hashing as illustrated in FIG. 2 are combined with administrator-configurable means of modifying these techniques dynamically or on-the-fly. Salting techniques protect against dictionary attacks whereby an attacker pre-computes a table of [PIN][Hash(PIN)] entries. In one example, the PINs and pre-computed Hash(PIN) values are accessible, but not necessarily concatenated or juxtaposed in memory. For example, if the attacker obtains the hash of a user's PIN (e.g., the Hash(PIN)), the attacker uses the hash as a lookup into the mapping in a pre-computed table. This technique carries a marginal cost to the attacker since the price of computing the mappings was paid upfront, offline.

The salting technique of one embodiment of the invention makes dictionary attacks untenable by storing Hash(PIN, $R_{64}$) and $R_{64}$, where $R_{64}$ is a per-user/per-PIN 64-bit random number. For example, the Hash(PIN, $R_{64}$) value and the $R_{64}$ value are accessible by an authentication module such as authentication module 106 in FIG. 1 in a local and/or remote memory area. In another example, the Hash(PIN, $R_{64}$) value and the $R_{64}$ value are concatenated, co-located, or otherwise stored together in memory. At validation time, the authentication module takes the PIN entered by the user, extracts $R_{64}$ from storage, calculates Hash(PIN, $R_{64}$) and compares it with Hash(PIN, $R_{64}$) from storage. To pre-compute a table of [PIN][$R_{64}$][Hash(PIN, $R_{64}$)] mappings, the attacker would need an impossibly large $2^{64}$ times as many entries as in the unsalted case, in this example.

In a brute force form of attack, the attacker has acquired the [Hash(PIN, $R_{64}$)][$R_{64}$] blob or other collection of binary data for a particular user along with the appropriate $R_{64}$ value for this user. The attacker computes [Hash(PIN, $R_{64}$)][$R_{64}$] for every possible PIN value. For a ten digit PIN, the attacker performs about $10^{10}/2$ computations. A ten digit PIN takes about one day to crack on a personal computer. The more common 6-digit PIN takes about nine seconds.

To defend against such a brute force attack, an iterative hashing technique such as the PBKDF1 algorithm published in RFC 2898 is employed. The algorithm computes $H_i$ as Hash($H_{i-1}$, $R_{64}$) for a pre-determined value for i, and where $H_0$ is Hash(PIN, $R_{64}$). Known as iterative hashing, this process scales the attacker's requisite effort up by the linear factor i. If i=3, for example, the (PIN, $R_{64}$) value is hashed 3 times as Hash(Hash(Hash(PIN, $R_{64}$))). Thus, a ten digit PIN with i=1000 requires three years to crack by brute force, on average, and a six digit PIN with i=500,000 requires approximately 50 days. While the logon computation may take longer (e.g., one second instead of a few nanoseconds), iterative hashing in one embodiment of the invention protects against a brute force attack, particularly when combined with a PIN expiration policy. For example, although 50 days might not appear very secure, when combined with an expiration policy of 45 days, it reduces the expected profit of an attack considerably.

The value chosen for i depends on several factors: user tolerance for logon times, desired PIN security, minimum required PIN length in an organization, and the computing power of the authentication hardware relative to the computing power of potential attackers. Because these factors are not known a priori by a software developer at shipment time, aspects of the invention support administrative discretion, dynamically or otherwise on the fly, of both i and the hashing algorithm (e.g., SHA1, SHA256, SHA512). Embodiments of the invention are operable with any hashing algorithm.

By storing and associating Hash(PIN, $R_{64}$), $R_{64}$, i, and algorithm, and BlobPIN with a particular user and PIN, the administrator may alter i and algorithm at any time when creating new PINs without disrupting existing user PINs. If this information was not stored on a per-user, per-PIN basis, a change in the value of i or algorithm would invalidate all existing PINs. When coupled with an administrator-configurable PIN expiration policy, the iterative hashing and salting solution effectively bolsters PIN-based security despite the inherent weakness of PINs relative to other kinds of passwords.

Figure 3A:
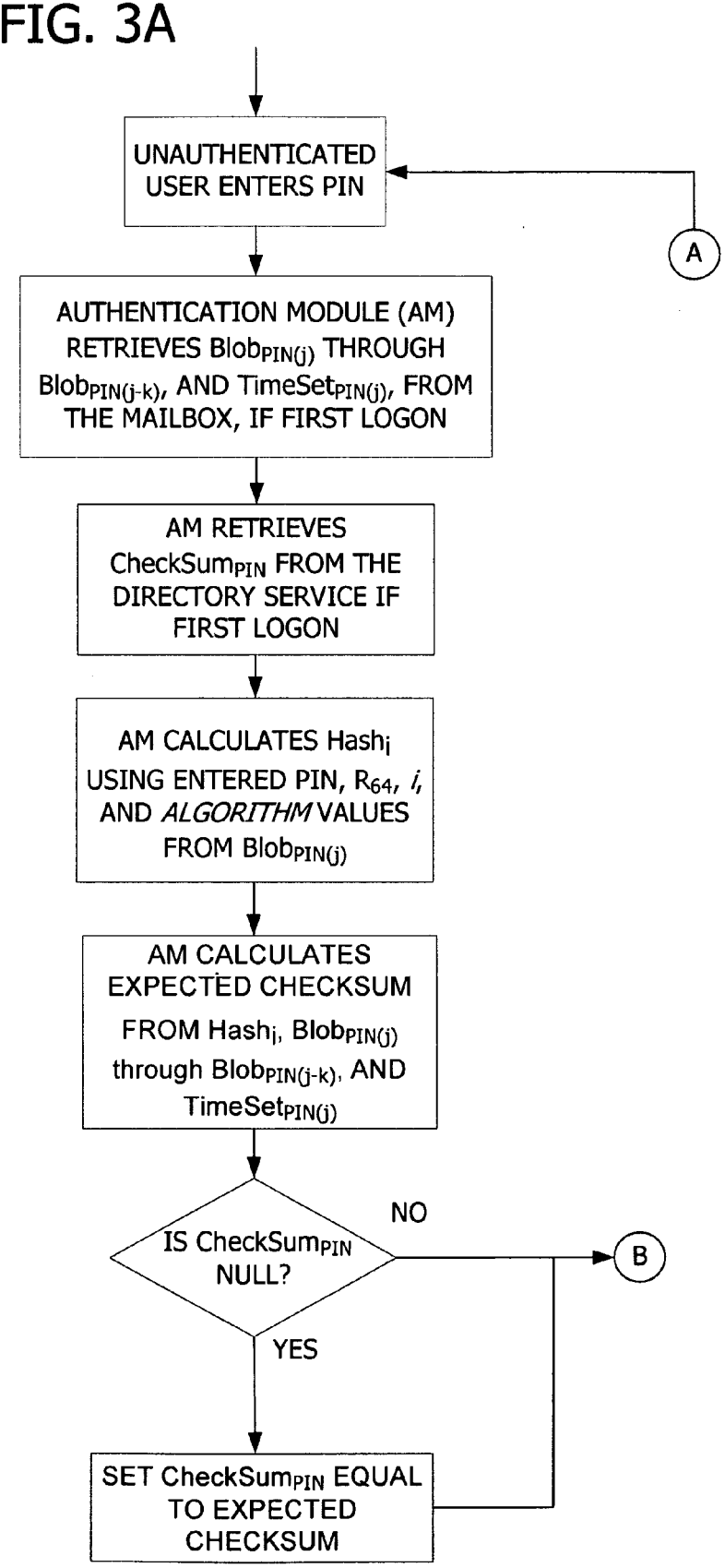
FIG. 3A and FIG. 3B are exemplary flow charts illustrating the interaction of an unauthenticated user with an embodiment of the invention.
Figure 3B:
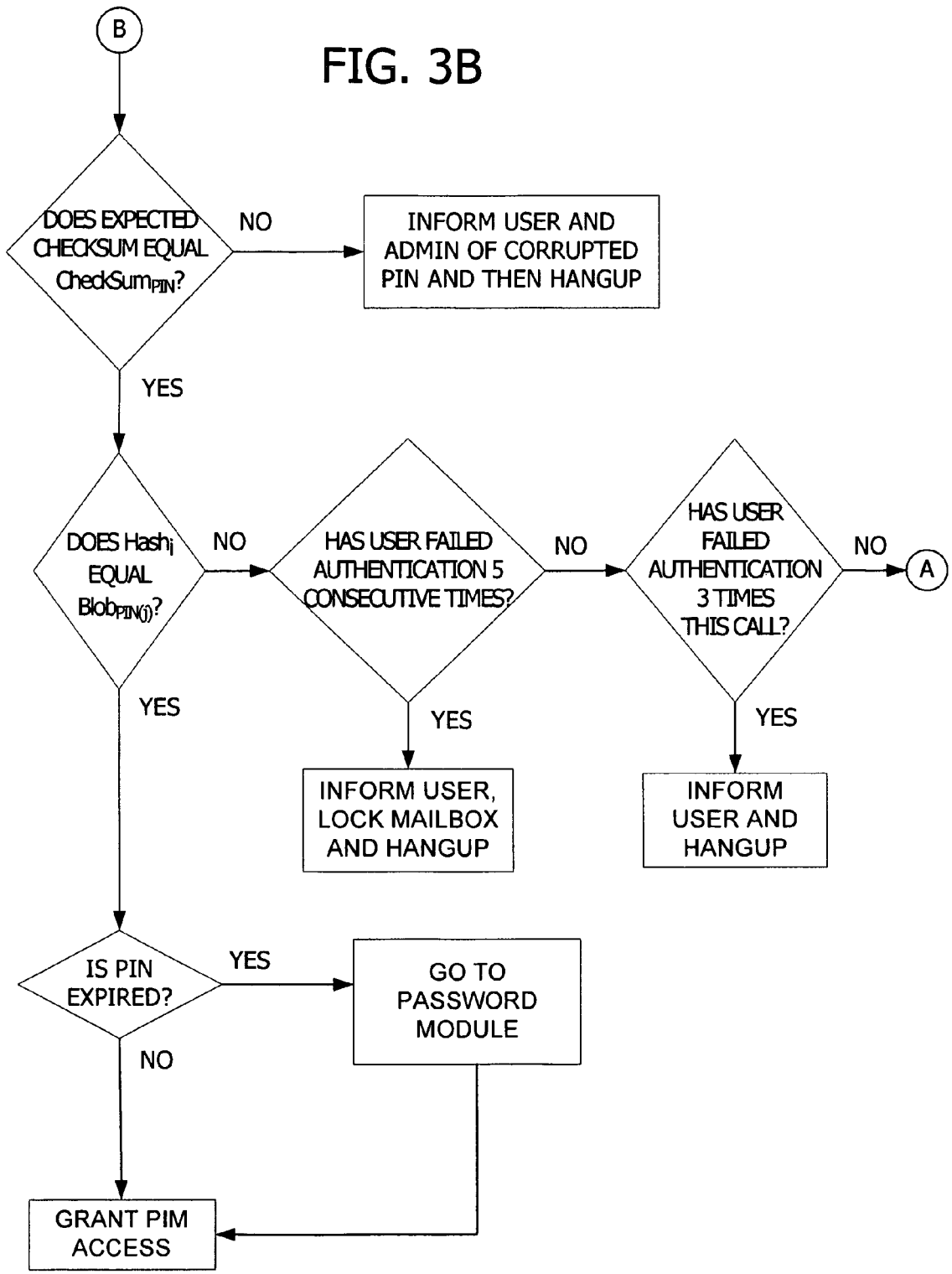

Referring next to FIG. 3A and FIG. 3B, exemplary flow charts illustrate the interaction of an unauthenticated user with an embodiment of the invention. In general, a processor executes computer-executable instructions for receiving an input PIN from the user, and for each of the one or more PINs of the user, the processor executes computer-executable instructions to:

retrieve existing PIN data for the user;

execute the hash algorithm identified in the retrieved PIN data based on the input PIN, the random number from the retrieved PIN data, and the iteration factor from the retrieved PIN data to create a verification hash value;

calculate a verification integrity value (e.g., a checksum) based on the created verification hash value; and grant access to the PIM data as a function of comparing the calculated verification integrity value with the integrity value from the retrieved PIN data and comparing the created verification hash value with the hash value from the retrieved PIN data.

In one embodiment, corruption of the hash value is detectable by computing the expected checksum against the checksum stored in a directory service such as directory service 110 at logon and then denying PIM access as appropriate. A computation for an exemplary checksum is shown below in equation 1.

$$\text{Checksum}_{PIN} = \text{SHA1}(\text{Blob}_{PIN(j)}), \text{Blob}_{PIN(j-1)}, \ldots, \text{Blob}_{PIN(j-k)}, \text{TimeSet}_{PIN(j)}) \quad (1)$$

where j is the jth most recent PIN the user has used, k is the number of previous PINs disallowed by company policy, and $\text{TimeSet}_{PIN(j)}$ is the Greenwich Mean Time, in nanoseconds from Jan. 1, 1970, when the PIN was last updated by the user. All of these parameters to the checksum are stored in the directory service in one embodiment.

Figure 4:
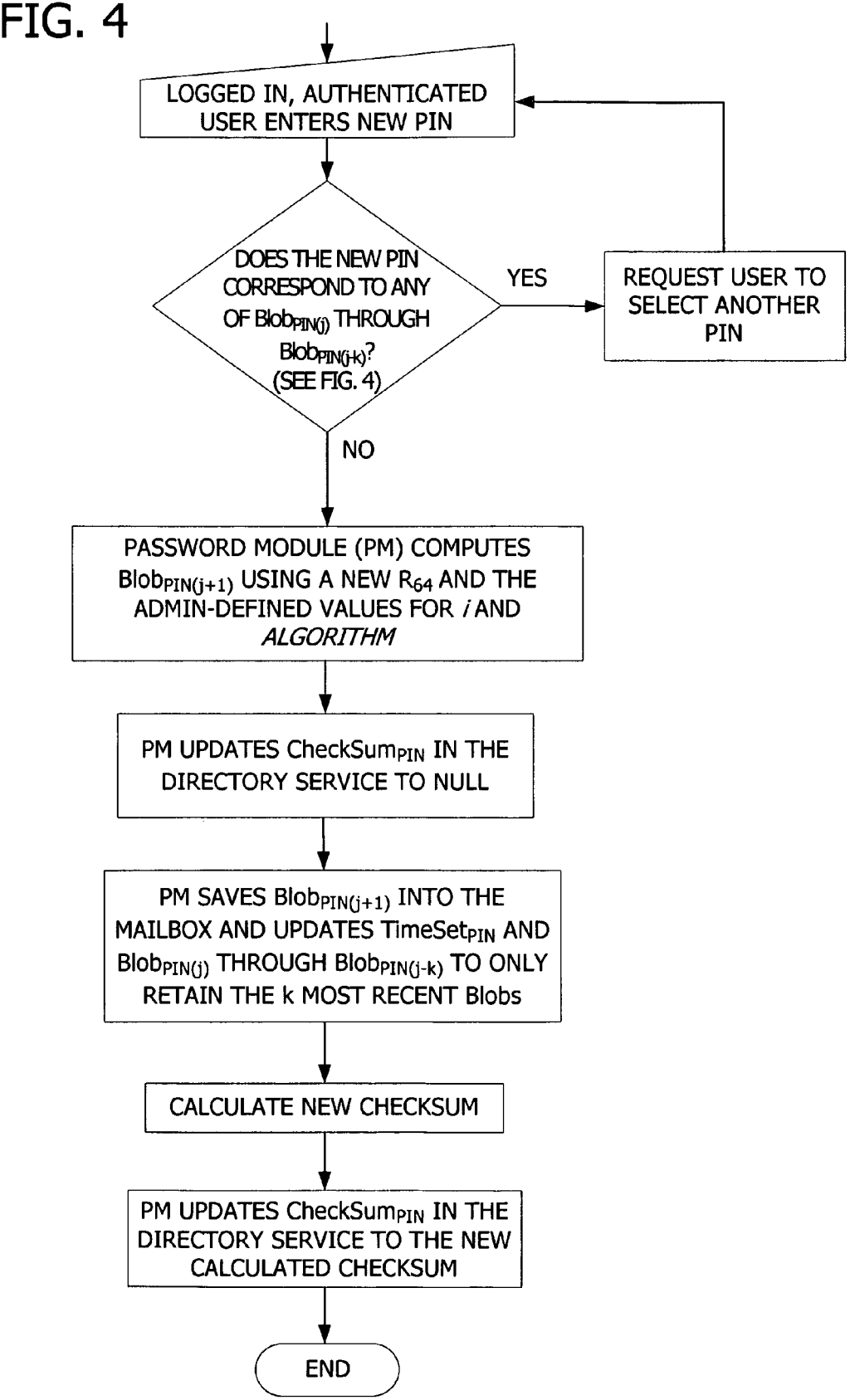
FIG. 4 is an exemplary flow chart illustrating the interaction of an authenticated user with an embodiment of the invention.

Referring next to FIG. 4, an exemplary flow chart illustrates an authenticated user interacting with a password module such as password module 104 in FIG. 1 to change the PIN. In general, the password module determines if the new pin corresponds to any previously used PINs, and if not, proceeds to generate new PIN data for the new PIN including a new checksum. In the embodiment illustrated in FIG. 4, the method clears out the checksum stored in the directory service, updates the PIN in the mailbox, and updates the new checksum in the directory service. The method ensures that the checksum and the mailbox PIN do not fall out of synchronization if either one synchronously fails and the other synchronously succeeds. Further, NULL values for the checksum are treated as valid but immediately updated upon a successful logon.

Figure 5:
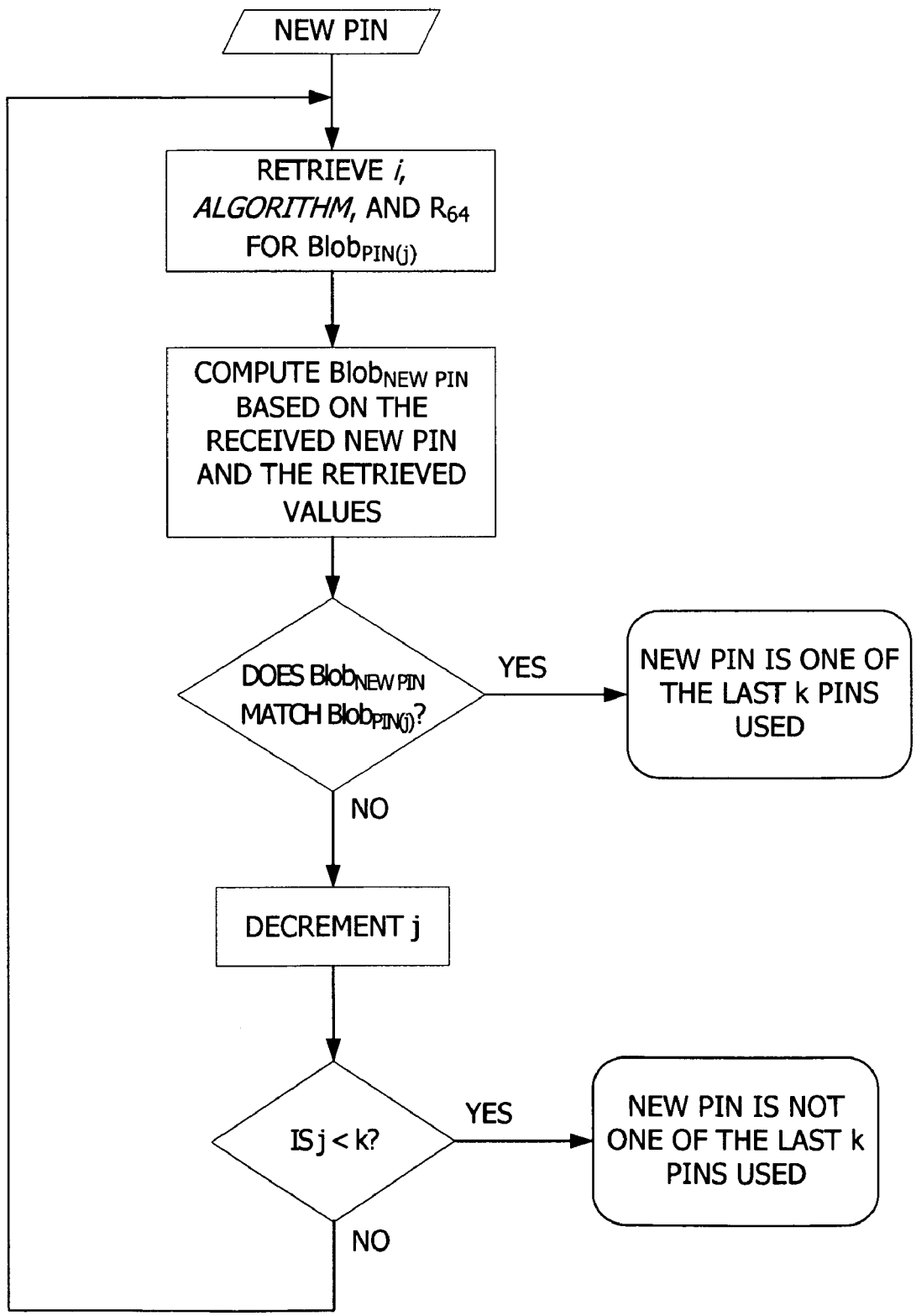
FIG. 5 is an exemplary flow chart illustrating the process for determining whether a particular PIN input by a user has been used previously.

Referring next to FIG. 5, an exemplary flow chart illustrates the process for determining whether a particular PIN input by a user has been used previously. In general, a blob is generated based on the new PIN and each set of stored PIN data. Each of the blobs is compared to the pre-computed, stored blobs. In the embodiment, the method only stores data relating to the k most recent PINs.

Exemplary Operating Environment

The exemplary operating environments illustrated in the figures include a general purpose computing device such as a computer executing computer-executable instructions. The computing device typically has at least some form of computer readable media. While the computer readable media may be part of the computing device in one embodiment, other embodiments contemplate that the computer readable media is accessible to the computing device (e.g., via a network). Computer readable media, which include both volatile and nonvolatile media, removable and non-removable media, may be any available medium that may be accessed by the general purpose computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The computing device includes or has access to computer storage media in the form of removable and/or non-removable, volatile and/or nonvolatile memory. The computing device may operate in a networked environment using logical connections to one or more remote computers.

Although described in connection with an exemplary computing system environment, aspects of the invention are operational with numerous other general purpose or special purpose computing system environments or configurations. The computing system environment is not intended to suggest any limitation as to the scope of use or functionality of aspects of the invention. Moreover, the computing system environment should not be interpreted as having any dependency or requirement relating to any one or combination of components illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, game consoles, personal media players, digital cameras, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

Aspects of the invention may also be practiced in distributed computing environments where tasks are performed by remote processing devices that are linked through a communications network. In a distributed computing environment, program modules may be located in both local and remote computer storage media including memory storage devices.

In operation, a computer executes computer-executable instructions such as those illustrated in the figures to implement aspects of the invention. Further, hardware, software, firmware, computer-executable components, computer-executable instructions, and/or the elements of the figures constitute means for providing access to the PIM data and means for storing the hash value and the integrity value in separate memory areas.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In one embodiment, one or more computer-readable media have computer-executable instructions for performing the methods illustrated in the figures and/or described herein to implement aspects of the invention. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method for securely storing a personal identification number (PIN) for unified messaging, said method comprising:
   receiving a PIN from a user;
   determining a random number;
   identifying a transformation adapted to operate on the received PIN and the determined random number for generating a mathematical transformation of the received PIN;
   identifying an iteration factor; and
   iteratively executing the identified transformation based on the iteration factor to generate a series of digits corresponding to the PIN.

2. The method of claim 1, wherein identifying the transformation comprises identifying the transformation based on administrator preferences.

3. The method of claim 1, further comprising storing the determined random number, the identified transformation, the identified iteration factor, and the generated series of digits corresponding to the PIN for subsequent manipulation of the generated series of digits corresponding to the PIN.

4. The method of claim 1, wherein identifying the transformation adapted to operate on the received PIN and the determined random number comprises identifying a hash algorithm adapted to operate on the received PIN and the determined random number.

5. The method of claim 1, further comprising generating an integrity value as a function of the received PIN, one or more previous PINs associated with the user, and a timeset value corresponding to a time associated with the last update to the PIN by the user.

6. The method of claim 5, further comprising storing the computed integrity value in a directory service.

7. The method of claim 1, further comprising storing the generated series of digits in a mailbox associated with the user.

8. The method of claim 1, wherein determining the random number comprises one or more of the following: generating the random number and receiving the random number.

9. The method of claim 1, wherein receiving the PIN, determining the random number, identifying the transformation, identifying the iteration factor, and iteratively executing the identified transformation comprise computer-executable instructions stored on one or more computer-readable media.

10. A system for providing access to personal information management (PIM) data, said system comprising:
   a memory area for storing personal identification number (PIN) data for each of one or more PINs of a user, said PIN data including a random number, a transformation identifier, an iteration factor, an integrity value, and a transformation value; and
   a processor for executing computer-executable instructions for:
      receiving an input PIN from the user; and
      for each of the one or more PINs of the user:
         retrieving the PIN data from the memory area;
         executing the transformation identified in the retrieved PIN data based on the input PIN, the random number from the retrieved PIN data, and the iteration factor from the retrieved PIN data to create a verification transformation value;
         calculating a verification integrity value based on the created verification transformation value; and
         granting access to the PIM data as a function of comparing the calculated verification integrity value with the integrity value from the retrieved PIN data and comparing the created verification transformation value with the transformation value from the retrieved PIN data.

11. The system of claim 10, wherein the memory area comprises a first memory area representing a mailbox of the user and a second memory area representing a directory service, and wherein the first memory area stores a transformation value associated with each of the one or more PINs of the user, and the second memory area stores the integrity value associated with each of the one or more PINs of the user, said integrity value being calculated as a function of each of the one or more PINs of the user.

12. The system of claim 10, wherein the memory area further stores a lockout count to prevent repeated attempts to access the PIM data.

13. The system of claim 10, wherein the input PIN comprises one or more of the following: alphanumeric characters and numeric-only characters.

14. The system of claim 10, wherein the transformation value comprises a binary large object.

15. The system of claim 10, wherein the random number comprises sixty-four digits.

16. The system of claim 10, further comprising means for providing access to the PIM data.

17. The system of claim 10, further comprising means for storing the transformation value and the integrity value in separate memory areas.

18. One or more computer-readable media having computer-executable components for controlling access to personal information management (PIM) data of a user, said components comprising:
  a password module for:
    receiving a first PIN from a user;
    identifying a transformation and an iteration factor;
    executing the identified transformation iteratively based on the iteration factor, the first PIN, and a random number to generate a first binary object corresponding to the first PIN;
    calculating a first integrity value as a function of the first binary object; and
    storing only the transformation, the iteration factor, the random number, the first integrity value, and the first binary object as PIN data corresponding to the first PIN; and
  an authentication module for:
    receiving a second PIN from the user;
    executing the transformation identified in the PIN data based on the second PIN, the random number from the PIN data, and the iteration factor from the PIN data to create a second binary object;
    calculating a second integrity value as a function of the second binary object; and
    granting access to the PIM data associated with the user as a function of comparing the second integrity value with the first integrity value from the PIN data and comparing the second binary object with the first binary object from the PIN data.

19. The computer-readable media of claim 18, wherein the first binary object and the second binary object comprise a series of digits.

20. The computer-readable media of claim 18, wherein the integrity value comprises a checksum.

* * * * *